(12) United States Patent
Lovberg et al.

(10) Patent No.: US 7,170,442 B2
(45) Date of Patent: Jan. 30, 2007

(54) VIDEO RATE PASSIVE MILLIMETER WAVE IMAGING SYSTEM

(75) Inventors: John Lovberg, San Diego, CA (US); Vladimir Kolinko, San Diego, CA (US); Richard Chedester, Whately, MA (US); Stuart E. Clark, St. Peters, MO (US)

(73) Assignee: Trex Enterprises Corp., San Diego, CA (US)

( * ) Notice: Subject to any disclaimer, the term of this patent is extended or adjusted under 35 U.S.C. 154(b) by 0 days.

(21) Appl. No.: 11/021,296

(22) Filed: Dec. 23, 2004

(65) Prior Publication Data

US 2005/0116947 A1    Jun. 2, 2005

Related U.S. Application Data

(63) Continuation-in-part of application No. 10/728,432, filed on Dec. 8, 2003, and a continuation-in-part of application No. 09/965,875, filed on Sep. 28, 2001, now abandoned, and a continuation-in-part of application No. 10/639,322, filed on Aug. 12, 2003, now Pat. No. 6,937,182.

(60) Provisional application No. 60/532,642, filed on Dec. 24, 2003.

(51) Int. Cl.
*G01S 13/89* (2006.01)
(52) U.S. Cl. .............................. 342/179; 250/332
(58) Field of Classification Search ................ 342/22, 342/27, 179, 149; 250/330, 332
See application file for complete search history.

(56) References Cited

U.S. PATENT DOCUMENTS 6,828,556 B2 * 12/2004 Pobanz et al. ........... 250/336.1

OTHER PUBLICATIONS

Prospects of imaging applications, Anderton, R.N.; Appleby, R.; Borrill, J.R.; Gleed, D.G.; Price, S.; Salmon, N.A.; Sinclair, G.N.; Lettington, A.H.; Terahertz Technology and Its Applications (Digest No: 1997/151), IEE Colloquium on Apr. 10, 1997, pp. 4/1-410.*
A real-time wide field of view passive millimeter-wave imaging camera, Clark, S.; Martin, C.; Kolinko, V.; Lovberg, J.; Costianes, P.J.; Applied Imagery Pattern Recognition Workshop, 2003. Proceedings, 32nd, Oct. 15-17 2003 pp. 250-254 Digital Object Identifier 10.1109/AIPR.2003.1284280.*
Passive millimeter wave imaging, Yujiri, L.; Shoucri, M.; Moffa, P.; Microwave Magazine, IEEE vol. 4, Issue 3, Sep. 2003 pp. 39-50 Digital Object Identifier 10.1109/MMW.2003.1237476.*

* cited by examiner

*Primary Examiner*—Ian J. Lobo
(74) *Attorney, Agent, or Firm*—John R. Ross (57) ABSTRACT

A passive millimeter wave imaging system that includes at least one millimeter wave frequency scanning antenna and multiple beam formers collecting narrow beams of millimeter wave radiation from a two-dimensional field of view. The collected radiation is amplified and separated into bins corresponding to various vertical and horizontal beam orientations. In a preferred embodiment the beam formers include one phase processor and 192 frequency processors. Two dimensional images of a target are obtained by the simultaneous detection of signal power within each beam and converting it into pixel intensity level at a rate of 30 frames per second.

14 Claims, 8 Drawing Sheets

VIDEO RATE PASSIVE MILLIMETER WAVE IMAGING SYSTEM

CROSS REFERENCE TO RELATED APPLICATIONS

This Application claims the benefit of Provisional Patent Application Ser. No. 60/532,642 filed Dec. 24, 2003 and is a continuation in part of the following patent applications: Ser. No. 10/728,432, filed Dec. 8, 2003, Ser. No. 09/965,875 filed Sep. 29, 2001 now abandoned, and Ser. No. 10/639,322 filed Aug. 12, 2003 now U.S. Pat. No. 6,937,182, all of which are incorporated herein by reference.

FEDERALLY SPONSORED RESEARCH

The present invention was made under contract with a branch of the United States Department of Defense and the United Stated Governments has rights in the invention.

BACKGROUND OF THE INVENTION

1. Field of Invention

The present invention relates to imaging systems and in particular to millimeter wave imaging systems.

2. Discussion of Prior Art

Imaging systems operating at millimeter wavelengths (1 cm to 1 mm; 30 GHz to 300 GHz) are well known. These systems can be important because light at these wavelengths is not completely attenuated by substantial distances of fog or smoke, as is visible light. Light at millimeter wavelengths will also penetrate clothing and significant thickness of materials such as dry wood and wallboard. These millimeter wave imaging systems have therefore been proposed for aircraft to improve visibility through fog and for security applications for detection of concealed weapons and the like. Such systems are described in U.S. Pat. Nos. 5,121,124 and 5,365,237 that are assigned to Applicants' employer. The systems described in those patents utilize antennas in which the direction of collected millimeter wave radiation is a function of frequency. This type of antenna is referred to as a "frequency scanned" antenna. The collected millimeter wave light is analyzed in a spectrum analyzer to produce a one-dimensional image. In the systems described in the '124 patent the antenna signal is used to modulate an acousto-optic device (a Bragg cell) that in turn modulates a laser beam to produce a spectral image. In the systems described in the '237 patent an electro-optic module is modulated by the antenna signal and the electro-optic module in turn modulates the laser beam to impose the millimeter wave spectral information on a laser beam that then is separated into spectral components by an etalon to produce an image.

U.S. Pat. No. 4,654,666 describes an imaging system which includes a frequency scanning antenna and a spectrum analyzer for converting coded radiation distributions collected by the antenna into a time coded distribution so that a one-dimensional scene can be reproduced. All of the above identified patents and patent applications are hereby incorporated by reference.

What is needed is a better video rate millimeter wave imaging system.

SUMMARY OF THE INVENTION

The present invention provides a passive millimeter wave imaging system that includes at least one millimeter wave frequency scanning antenna and multiple beam formers collecting narrow beams of millimeter wave radiation from a two-dimensional field of view. The collected radiation is amplified and separated into bins corresponding to various vertical and horizontal beam orientations.

In a preferred embodiment the beam formers include one phase processor and 192 frequency processors. Two dimensional images of a target are obtained by the simultaneous detection of signal power within each beam and converting it into pixel intensity level at a rate of 30 frames per second. In this application Applicants will refer to frame rates of 10 Hz or greater as video rate, recognizing that 30 Hz is the standard video rate. In a preferred embodiment the receiving antenna is a 0.6×0.6 meter flat antenna constructed from a single polyethylene dielectric plate laminated with copper on both sides and having parallel rows of narrow slots etched through the copper on one of the laminated sides. Incident mm-wave signals enter the antenna through the slots and propagate inside the dielectric plate toward antenna-to-waveguide transitions of 232 output ports of WR-9 waveguide size. Spacing between rows of slots determines the frequency scanning characteristics of the antenna. In the preferred embodiment the spacing is 0.078 inch such that a 0.3 degree wide beam scans by scanning a 24-degree elevation field of view corresponding to a frequency band between 75.5 GHz and 93.5 GHz. The output signal of the antenna is amplified at each of the 232 outputs with individual low noise amplifiers (LNA) having a gain of 50 dB and noise figure of 7–8 dB. Each of the amplified signals feeds into a phase processor beam-former. The beam-former channelizes input signal power into one of 192 output ports depending on the signal wave angle of incidence on the antenna in horizontal (azymuthal) plane. The phase processor is made from a two-layer dielectric (polypropylene) plate with a Rotman-type circuit etched in a copper layer in the center of the plate. The two-layer dielectric plate is sandwiched between two copper ground plates. Signal power from each output of the phase processor is further amplified and directed into individual frequency processor beam-formers. In the preferred embodiment each of the frequency processor beam-formers comprise a tapped delay line feeding a Rotman lens to perform spectral analysis of the input signal in the 75.5–93.5 GHz band with resolution 300 MHz. Each of the 192 frequency processors has 128 frequency outputs terminated into individual detector circuits. Analog-to-digital converter chips read detector voltages which are proportional to the signal strength within a particular beam and sort data into image pixels. Raw pixel intensity data is then numerically processed and displayed by a PC as an image.

The 75.5–93.5 GHz portion of the electromagnetic spectrum is chosen as it offers a good balance between clothing penetration as well as spatial resolution and therefore allows compact, practical sized systems suitable for law enforcement to be built. By measuring only natural thermal emissions (from living beings and inanimate objects), and reflections of natural ambient sources (such as the cold sky and much warmer earthly objects), passive millimeter-wave imaging is intrinsically safe and suitable for imaging people. Indeed it is worth noting that illumination of outdoor objects within a field of view of the imager by radiation from the cold sky (providing deep space radiation corresponding to temperatures of about 70 K) can produce contrasts very clearly defining reflecting objects hidden under clothing.

The preferred imager uses a novel frequency scanned phased array flat panel antenna coupled to MMW low noise amplifiers (LNAs), to produce enough signal to allow a two-dimensional MMW Rotman lens (comprised of one phase processor and 192 frequency processors), to perform the Fourier transform that is needed to convert from the antenna (pupil plane) data to the image plane data. Custom detector diodes and A/D chips are then used to detect and digitize the image plane MMW signal. The digitized signal is then fed to a high performance PC for processing and display.

The antenna that maps position to phase in the horizontal direction (i.e. functions as a conventional phased array in this direction). However in the vertical direction, the antenna uses a position to frequency mapping. To better understand this, consider an optical diffraction grating illuminated with white light. On the output side, one sees distinct colors at well defined viewing angles. By reciprocity, if a white source is located at an angle to the grating, then only a particular narrowband color will pass through the grating. This is exactly the case with the preferred embodiment where we are dealing with all sorts of natural (broadband) sources in the field of view. For each elevation, the antenna will only pass (respond) to one particular narrowband signal and thus we have an effective one to one elevation to frequency mapping. As a result of its operation, the antenna is referred to as a frequency scanned phased array antenna.

In addition, by the nature of its design and how many slots and output holes are cut into it, the antenna allows the incident signal to be channelized, i.e. broken up into discrete separate channels (232 in this case) that can then be individually amplified. This last step is critical since there is currently no way to amplify a spatially continuous signal, it must be broken down in to discrete channels that can be fed to amplifiers whose input (typically a small waveguide) is less than a wavelength in size.

DETAILED DESCRIPTION OF PREFERRED EMBODIMENTS

System Configuration

Figure 1:
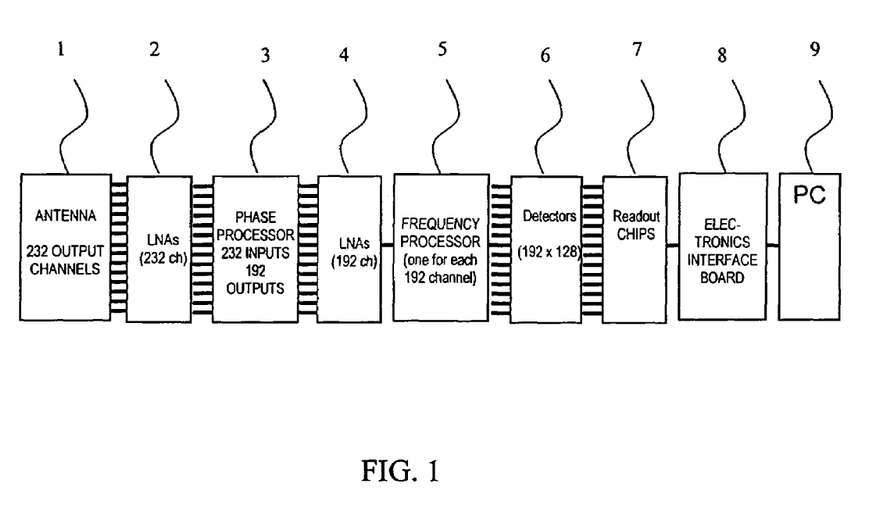
FIG. 1 is a block drawing of a preferred embodiment of the present invention.

FIG. 1 represents a block diagram of a preferred embodiment of the present invention that Applicants have named the "PMC-2" imager. A slotted antenna 1 having a 0.6×0.6 meter aperture is responsible for collecting mm-wave radiation from a scene being imaged at angular resolution of approximately 0.35 degree in both horizontal (azimuthal) and vertical (elevation) planes. The antenna has 232 WR-9 waveguide output ports using impedance transformers that match impedances between the antenna and 232 front end low noise broadband amplifiers 2. Each of the low noise amplifiers operate from 75.5 GHz to 93.5 GHz, have a 50 dB gain, a 7–8 dB noise figure, +/−3 dB gain flatness and matched phase characteristics among all 232 channels. It is critical for proper performance of the imager that the amplifiers have same signal delay from their input to output ports to be able to form sharp azimuthal beams at all operation frequencies. Amplified signals enter the first beam forming element of the system—the phase processor 3. Phase processor has same number of 232 input channels and is connecting to the outputs of the front end amplifiers 2. The phase processor separates broadband signals from the scene into 192 individual horizontal (azmuthal) beams each about 0.13 degrees wide, according to their angle of incidence onto the antenna. This provides a horizontal azmuthal field of view of about 30 degrees. Each of the beams is focused onto one of the 192 output ports of the phase processor. Signals from the phase processor outputs are amplified by 192 low-noise back-end amplifiers 4 to a power level of approximately 0 dBm. The output level is limited by a 1 dB compression point of the back end amplifiers. (In another preferred embodiment the back-end amplifiers would provide uncompressed output power between 0 dBm and 10 dBm to facilitate signal detection in the frequency processor boards.) Signals from the back-end amplifiers enter frequency processors 5, one processor for each of the 192 phase processor channels. Each frequency processor is a Rotman lens beam-former that has a tapped delay line input network. The combination of the delay line input network and the Rotman lens constitute an analog mm-wave Fourier transformer that splits incident broadband power into 128 frequency dependent beams inside the processor. Each beam is 300 MHz wide and represents an elevation angle that is 0.125 degrees wide for a total elevation field of view of about 24 degrees. The beams are focused into 128 output ports of the frequency processor boards, each port corresponding to a unique frequency between 75.5 GHz and 93.5 GHz. Due to the frequency scanned nature of the slotted antenna, the center frequency of each frequency processor output port corresponds to a certain elevation angle from which the signal power at this frequency impinges on the antenna surface. Signals from all 128 frequency processor outputs representing various elevation beams and signals for all 192 frequency processors representing azimuthal beams is detected by 24,576 (128×192) detectors 6 to measure millimeter wave signal power arriving at the antenna from each particular direction. Detected voltages are amplified, conditioned and digitized by readout chips 7 and via an interface board 8 are directed into a personal computer 9 for image processing and display.

Slotted Antenna

A very low profile slotted antenna 15 (shown in FIG. 2) is the mm-wave signal collecting element of the imager. The power collected by the antenna is sorted into narrow pencil beams filling the 30 degrees wide azimuth and 24 degrees wide elevation field of view of the system. The 24×24 inch antenna provides an angular resolution of about 0.35 degree. Signals from the antenna are picked off at output edge at the bottom of the antenna by 232 impedance matching wedge-type horns with WR-9 output ports. (Only 20 are shown in the FIG. 1 drawing.)

The antenna is made from a single 0.03 inches thick polyethylene plate laminated with copper on both sides. The antenna's aperture is filled with 300 rows and 300 columns of small slots 14 etched through the copper on the radiation collecting side of the plate. (Note that all of the slots are not shown in FIG. 2.) The other non-etched side is glued to a stiff honeycomb ultra flat plate 13 with the surface roughness less than 0.01 inch. Rows of slots are aligned parallel to the bottom output edge of the antenna 16. Spacing between rows is 0.078 inch which makes the antenna beam elevation angle vary from 4 degrees at 93.5 GHz through 28 degrees at 75.5 GHz as measured from the normal to the antenna surface. The center line of the 0.35 degree wide beam at each frequency is tilted towards the output edge of the antenna (in this embodiment, the bottom edge) as shown for the antenna side view 17 in FIG. 2. Azimuthal field of view of the system is symmetric relative the antenna normal as shown in the top view 18 of the antenna in FIG. 2. In the preferred embodiment there are 300 columns with slot sizes being is 0.008× 0.032 inches, with the long side of the slot aligned parallel to the output edge of the antenna. The column spacing of the slots is at 0.08 inches. Slot size and spacing between columns is chosen to optimize antenna efficiency and angular resolution. If the slots' signal coupling is too large or too small the effective size and efficiency of the antenna will be reduced thus reducing thermal sensitivity and spatial resolution of the imager. The above described preferred design of the slotted antenna is believed to be near optimum for its desired performance characteristics. Applicants estimate the signal loss in the antenna to be within 3–4 dB.

Signal Processing Circuits and Electronics

Calibration

Figure 3:
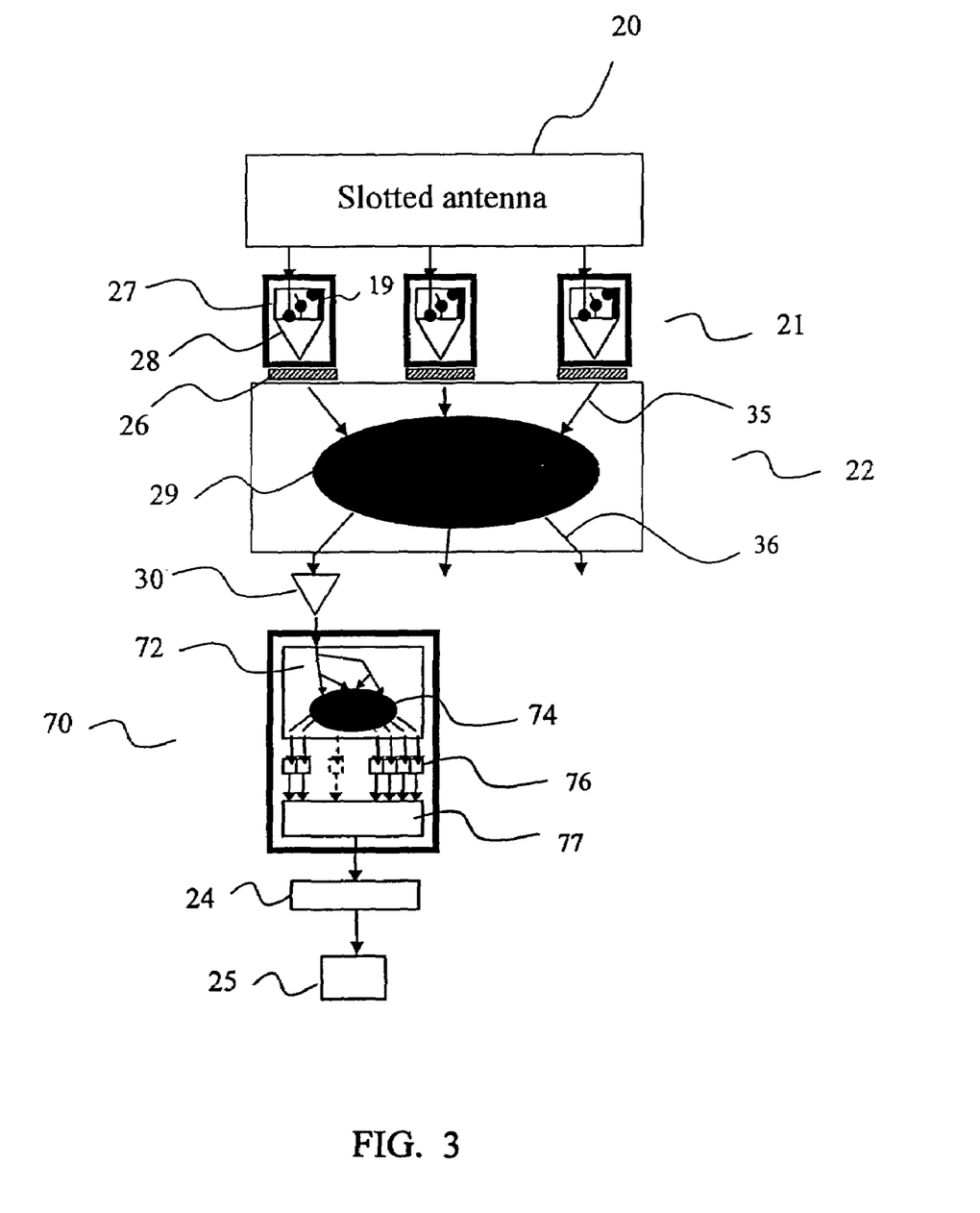
FIG. 3 is a diagram of signal processing circuits.

In this preferred embodiment Dicke switching is used for calibration of the imaging system. This technique utilizes, as shown in FIG. 3, front-end Dicke switches 27 alternates between looking at an antenna output 20 and looking at a set temperature load 19. The front-end switches 27 switch at a rate of 3.84 kHz. The load can be heated by approximately 40 K for one switching cycle. This allows the unit to perform a two-temperature calibration in real time, compensating for gain fluctuations in the amplifiers as well as temperature offsets. The switch itself is a W-band microwave monolithic integrated circuit (MMIC) PIN switch with a transmission loss of 1.8 dB. A monolithic resistor 27A that serves as a matched load is also used as self heating element when switch 27 allows an electrical current to pass through it. Resistor 27A is extremely small (2 microns×45 microns×50 microns) so that its heating and cooling occur much faster than duration of a single Dicke switch cycle. During temperature calibration event switch 27 is locked in the load position the heater switch starts oscillating at 3.84 KHz speed. The resulting rise an fall in the load temperature produces a differential signal that is used for measuring system gain based on a known thermal input produced by the heater current. The two-temperature system gain measurement in real time allows to compensate for gain drift in the amplifiers as well as other gain related offsets. The Dicke switches are MMIC AlGaAs PIN switches fabricated by M/A-Com with a transmission loss of 1.8 dB. Each front-end Dicke switch is packaged with, and feeds directly into, a front-end amplifier unit 22. This front-end amplifier unit consists of two low noise MMIC amplifiers, a band pass filter and an output MMIC power amplifier. The amplifiers are required to have a wide bandwidth but maintain a low noise figure, as they set the noise temperature for the entire system.

Low Noise Amplifiers

The Dicke switches 27 are packaged with low noise amplifiers in signal amplification channels 21, one amplification channel for each of the 232 outputs of the antenna. (Only 3 are shown in FIG. 3.) A single low noise amplifier channel 21 is shown in more detail in FIG. 3A. Each amplification channels 21 includes a series of three low-noise MMIC wide-band amplifier units 28A, 28B and 28C. The amplifiers are required to have a wide bandwidth but maintain a low noise figure, as they set the noise temperature for the entire system. They operate over an 18 GHz bandwidth, from 75.5 GHz to 93.5 GHz. with a noise figure of approximately 7–8 dB. The MMIC amplifiers and other amplification unit components are preferably fabricated using a co-planer waveguide design on an indium phosphide substrate. Eight amplification channels are packaged in a gain unit that Applicant's call an "octapak".

Octapaks

Figure 3A:
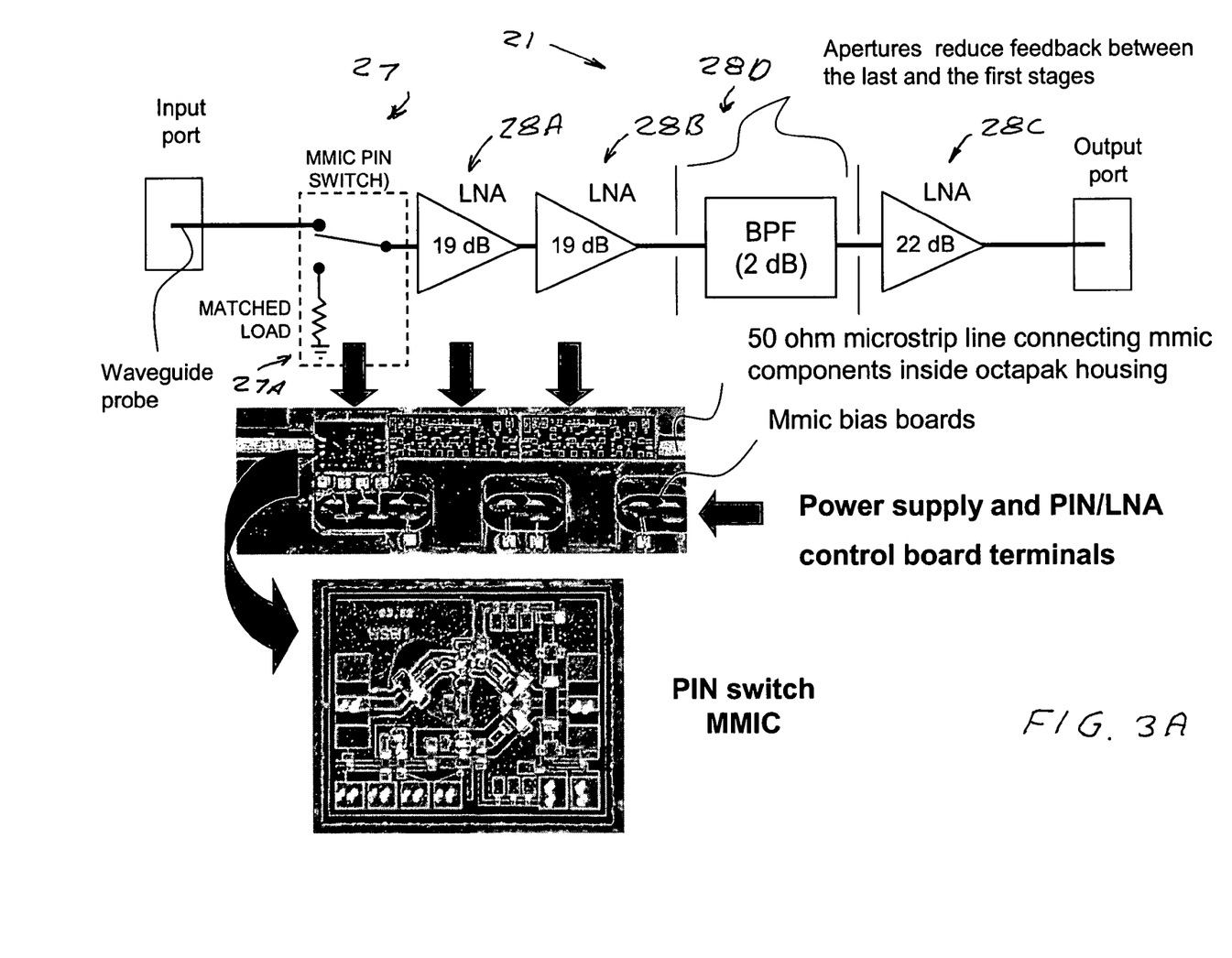
FIG. 3A is a graphic description of an amplification channel.

Each octapak module packages 8 parallel mm-wave low noise amplifier (LNA) channels. The channels are isolated to prevent signal crosstalk and oscillations. To maximize isolation and suppress signal feed back within individual LNA circuits, they are completely enclosed into waveguide like channels machined into a metal housing. MMIC chips are laid out inside the channels and interconnected to each other either by wire bonds or short runs of low loss micro-strip lines. The lines are connected to the MMIC's with the gold wire bonds. MMIC's and micro-strips are glued to the metal housing with conductive epoxy to ensure proper grounding conditions. Each LNA channel has short waveguide input and output ports as shown in FIG. 3A. Probe transitions are used to transfer mm-wave signals from the ports to the micro-strip lines and to the MMIC's. The probes are made from the same material (Duroid or alumina) as the 50 ohm micro-strip lines. Small apertures in the octapak housing are made and bias boards terminals are inserted into the apertures as shown in FIG. 3A. The boards and the terminals provide the necessary bias voltages for the MMIC chip components. The boards are lined with thin layers of mm-wave absorptive materials, such as Eccosorb, that prevents microwave power from leaking into and out of the channel. Bias terminals are wire bonded to the gate and drain pads of the MMIC's via single layer bypass capacitors. The capacitors are glued to the metal housing with conductive epoxy as close as possible to the bias pads on the MMIC's.

Figure 3B:
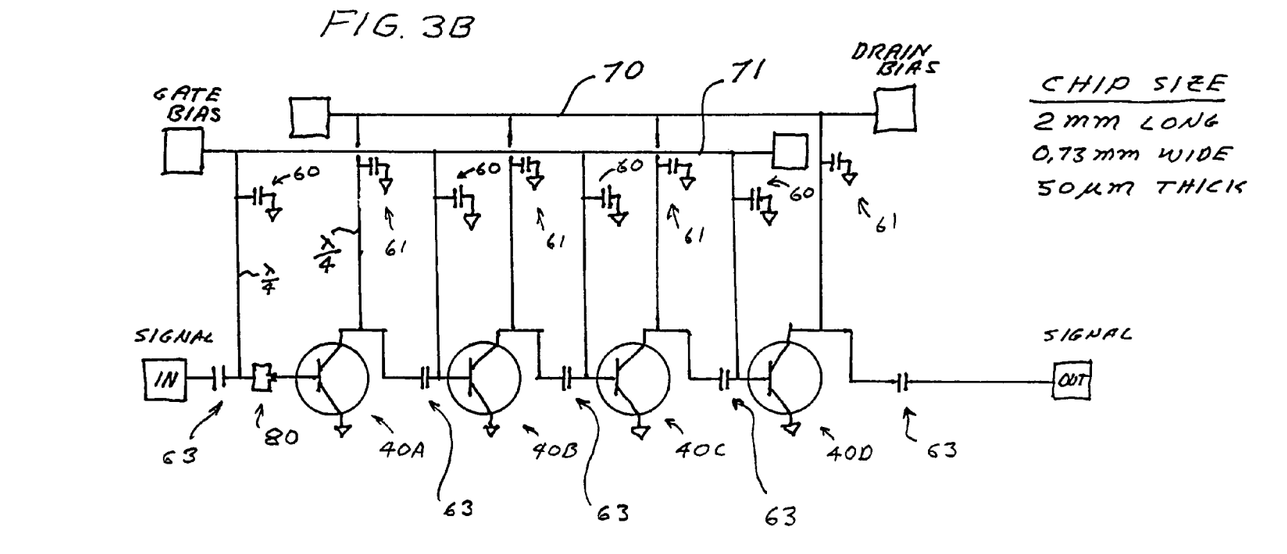
FIG. 3B shows some electronic features of a MMIC amplifier chip.
Figure 3C:
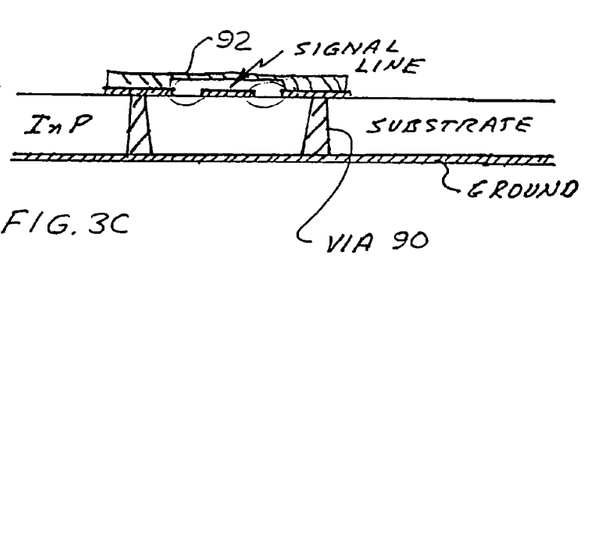
FIG. 3C shows some lithographic features of the chip.
Figure 3D:
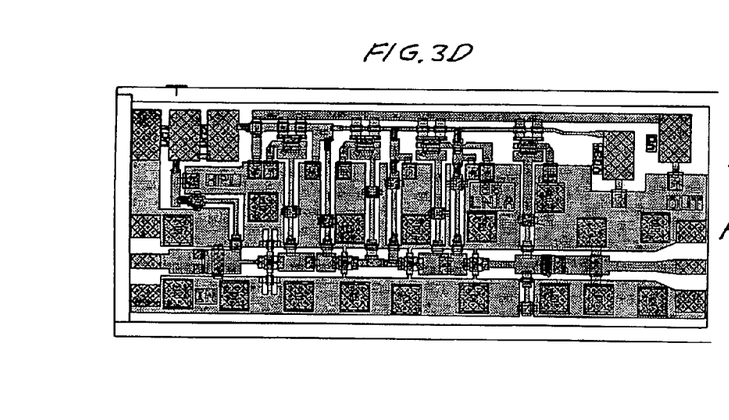
FIG. 3D is a drawing showing features of the chip.

The first two amplifiers in the chain 28A and 28B have a noise figure of approximately 4 dB over the 18 GHz band and a gain of about 19 dB. A band pass filter 228D defines a frequency band of system operation where the amplifiers show optimum gain and noise performance. The third amplifier 28C is tuned for a gain of about 22 dB and has a power compression point at approximately 3–4 dBm, several dB's higher than the low noise amplifiers. Each amplifier channel 22 provides about 55 dB of gain, as well as an integrated matched load with a heater, and PIN switch for in-situ two-temperature gain calibration. Each of the MMIC amplifiers shown in FIG. 3A (i.e., 28A, 28B and 28C) are custom designed using HEMT (high electron mobility transistor) technology on a 50 micron thick Indium Phosphide (InP) substrate. FIG. 3D is a drawing showing actual features of amplifier 28A. Each MMIC includes cascaded transistor amplifiers 40A, 40B, 40C and 40D as shown in FIG. 3B and are preferably fabricated using a grounded co-planer waveguide design on the InP substrate. Quarter wave ($\lambda/4$) lines effectively terminated with bypass capacitors 61 and 60 ensure adequate isolation of each transistor stage from the drain 70 and gate 71 bias lines to prevent mm-wave frequency feedback and oscillations in the cascaded amplifier circuit. Each stage is separated from each other by a DC blocking capacitors 63 and may include an impedance matching transformer 80 which reduces reflection losses between stages, input and output ports. Due to extremely high frequency of operation a special care is taken in the chip to minimize parasitic active and reactive elements in the circuit design, reduce crosstalk and suppress unwanted modes from being excited. One example of such techniques is shown in FIG. 3C where ground vias 90 are used to shorten the electric current path length between ground pads and plates. Conductive metal bridges 92 over signal lines reduce parasitic inductances by shortening current flow path length and suppressing odd-modes in the co-planar lines. This and other techniques are well appreciated in the field of microwave circuit design and described in details in the literature such as (R. N. Simons, Coplanar Waveguide Circuits, Components, and systems, John Wiley, New York, 2001).

The last (3rd) stage MMIC amplifier 28C of the LNA circuit and the micro-strip band-pass filter 28D are each assembled within their own cavity and receive signal from the previous stages through a narrow aperture in the channel, which is just wide enough to pass the micro-strip line. This helps to further isolate the final stage of the module where most of the output power is generated from the front stages that are very sensitive to small signals. All of the above measures provide for minimum feedback from the last LNA stages to the first LNA stages and prevent the amplifier from bursting into oscillations. Once assembled each channel is individually optimized for gain and noise characteristics by varying bias voltages.

Phase Processor Beam Former

Amplified broadband signals from the antenna's 232 output ports are processed in the azimuth plane beam former 22 that Applicants call a "phase processor". The phase processor is made from two 0.01 inch thick polypropylene plates. A thin copper sheet is laminated on one side of one of the plates. Signal processing artwork is etched in the copper sheet and then two plates are fused together in a thermal process with the etched copper sheet sandwiched in between. As a result the conductive signal processing circuit becomes embedded in the center of a two-layer 0.02 mils thick dielectric plate. The top and bottom surfaces of the slab are then laminated with copper sheets to provide signal ground surfaces. Input and output lines of the processor are 50 ohm strip lines ending with exposed copper pads for making connections to the strip line WR-9 waveguide transitions. Transitions are broadband tapered center-ridge type transitions made in the WR-9 waveguide to match the impedances between the strip lines and the WR-9 waveguide output ports of the octapaks. The phase processor beam-former has 232 strip line input lines 35 (only 3 are shown) that feed into a Rotman type lens 29. All input lines have same electrical length to provide equal time delay of the signal from the inputs into the phase processor to the inputs into the Rotman lens. The Rotman lens focuses incident power representing 192 (again only 3 are shown) vertical beams 0.35 degree wide (and somewhat overlapping) spread over a 30-degree azmuthal field of view into 192 output ports 36.

Figure 4:
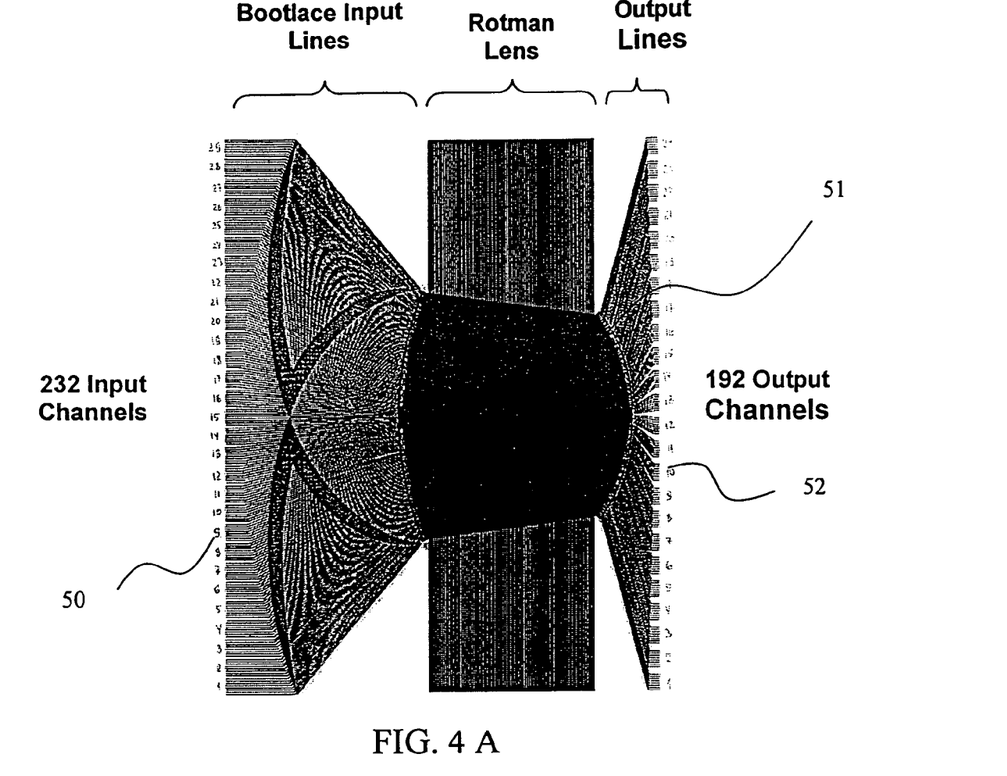
FIG. 4A show a phase processor beam-former circuit and azimuth beam diagram.
FIG. 4B show an antenna signal representing azimuth angle.

The signal at each of the 192 ports corresponds to a unique azimuth angle of the antenna beam. Small delay time variations among front end octapaks 21 and input lines 35 are compensated with phase shifters 26 that can be adjusted manually. Each output of the phase processor is connected to a back end octapak gain module 30 and then to an individual frequency processor beam former 72 through an impedance matching transition. The back end octapak gain modules do not incorporate Dicke switches and do not have to be low noise amplification units. A more important characteristic of the back end amplifiers is the high 1 dB compression point which provides a non-distorted signal to the frequency processors at a 0 dBm to 10 dBm levels. An actual phase processor circuit layout is shown in FIG. 4A, where 232 strip lines 50 transfer incoming signals to the Rotman type lens 51. The signals are sorted by the lens according to their azimuth angles and are taken out of the board by the 192 output lines 52. FIG. 4B is an example of measured antenna and phase processor beam forming quality in the azimuth plane. A sharp peak 53 is the signal corresponding to a bright point source in the azimuthal field of view. The signal's azimuth angle has a 0.35 degree width according to the system design objectives.

Frequency Processor Beam-Former

Figure 5A:
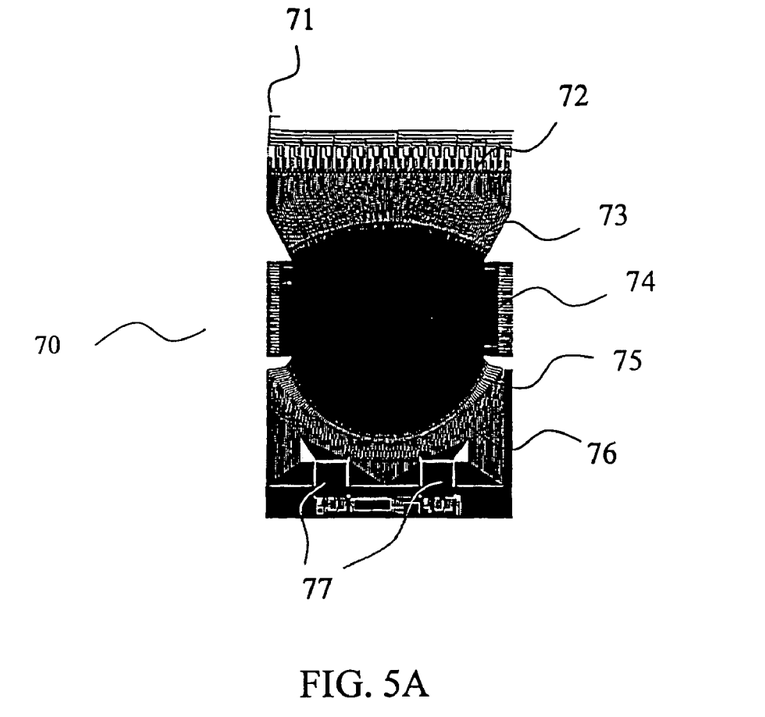
FIG. 5A shows frequency processor beam-former circuit.
Figure 5B:
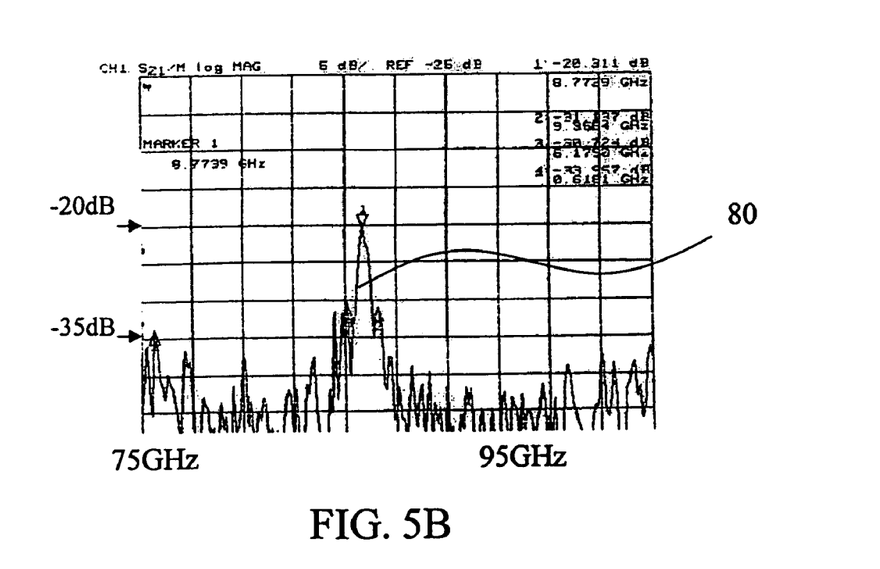
FIG. 5B shows a frequency response diagram.

After back end amplification the broadband signals from the phase processor enters a tapped-delay frequency processor beam-former 70 as shown in FIG. 5A and FIG. 3 for decomposition into frequency bins representing elevation beams of the antenna field of view. As shown in further detail in FIG. 5A the beam former includes an input line 71, a delay line network 72, a Rotman type lens 74, horn arrays at the input 73 and output 75 of the lens. Signal lines connected to the output horns are terminated into a mm-wave detector circuits 76 tuned to specific frequencies. A delay line network splits the signal power among 128 input horns 73 and creates a constant time delay between signals radiated by adjacent horns into the Rotman type lens. At the other end of the Rotman type lens these signals combine constructively for a certain frequency at one of the 128 output horns 75 thus sorting mm-wave power into different output ports for different frequencies. Incremental signal delays between the 128 input horns 73 are selected to achieve 300 MHz frequency resolution of the beam-former in the frequency range 75.5 GHz and 93.5 GHz. This narrow band focusing capability of the beam-former has been accomplished and demonstrated experimentally at by Applicants as illustrated by FIG. 5B. A narrow peak 80 seen in FIG. 5B represents a response to a bright source located in the elevation field of view at a vertical location corresponding to one of the 128 output channels of the beam-former. Similar sharp responses have also been observed at each of the 128 output channels of the circuit for other frequencies. The beam former is implemented in a low loss dielectric, such as polypropylene, with smooth copper cladding. The delay lines 26 are created at very low cost with lithographic etching that creates the circuit pattern, which is then sandwiched between two ground planes in a heated press. In the preferred embodiments, the smoothness of the copper making up the inside surface of the delay lines is extremely important. The requirement for 0.5 dB or less per inch requires the copper surface roughness to not exceed 300 nanometers. Prior art microwave surface roughness specifications were 1400 to 2900 nanometers.

Signal Detection and Sampling

At a single input frequency the frequency processor beam-former material is responsible for approximately 20 dB signal loss according to the data in FIG. 5B. For an 18 GHz broadband input an additional 21 dB signal loss is due to input power splitting among 128 output channels resulting in a total signal attenuation of at least 41 dB per channel.

This very low power is then detected by channel detectors 76. The detector output voltage is amplified, integrated and digitized by readout chips 77. Very high sensitivity mm-wave detector diodes are used in the imager such as Sb-heterostructure diodes to insure that signal-to-noise performance of the imager is not degraded in the detector and readout circuitry.

The near-DC signal produced by the detector diodes is digitized, using a 64-channel 7-bit (instantaneous) ultra low noise MUX chip of the type available from suppliers such as Indigo Systems of Santa Barbara, Calif. To improve performance and substantially reduce cost, the chip was designed with a 7-bit digitizer and a sampling time of 1/64th of a standard 33 ms frame, i.e. approximately 0.5 ms per sampling interval. By using 63 of the possible 64 sampling intervals that are present in a standard 33 ms (30 Hz) frame, the output signal resolution is effectively increased to 10 bits. Data is transferred from buffers on the chip to a readout board during the remaining sampling interval. A custom readout board that takes the parallel outputs from the 384 MUX chips that are present in the imager and converts it to a single serial output in RS-422 digital video format. This readout board makes extensive use of FPGA chips to buffer and then re-format the parallel signals into a single serial signal.

Data Acquisition System

To allow for a degree of sensor fusion and for comparison purposes, the ability to simultaneously capture MMW, visible and IR images of the same scene taken at the same time is built into the imager by using RS-422 compatible digital visible and IR cameras. Digital framegrabber boards coupled with appropriate software is then used to run a C based program control all aspects of the imager.

Due to the loading that the three data streams places on the PCI bus that is currently standard on PC's, the PC that controls the PMC has two independent PCI buses and four processors. The code, which is multi-threaded, allows for each sensor's data to be acquired and processed on its own processor, with one processor left to actually display the data via calls to the appropriate windows API functions.

Thus as shown in FIG. 3, digitized signals for each of the 128 frequency channels are received by an interface module 24, which communicates with computer 25 where the data is finally processed and displayed into an image. The computer is also responsible for setting optimum performance parameter of the imager such as channel gains, integration time etc.

System Packaging.

Figure 2:
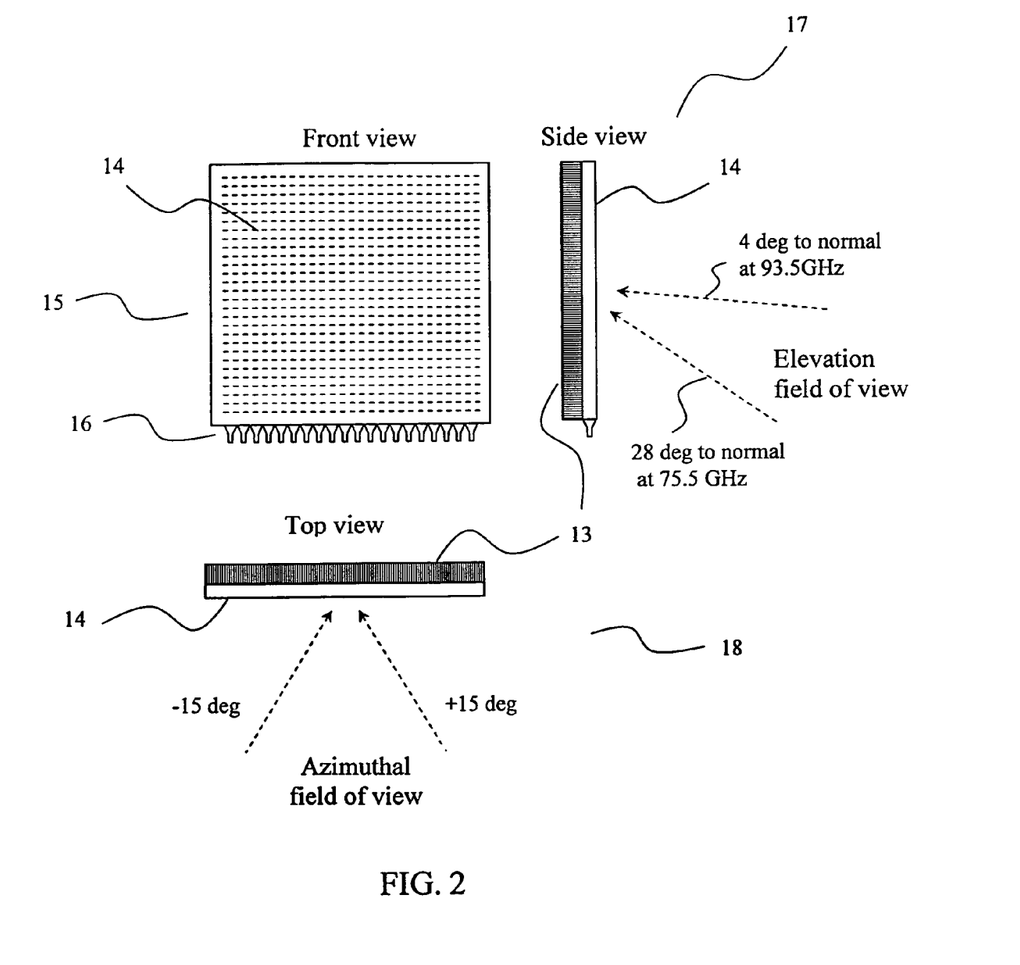
FIG. 2 is a drawing of a slotted plate antenna.
Figure 6:
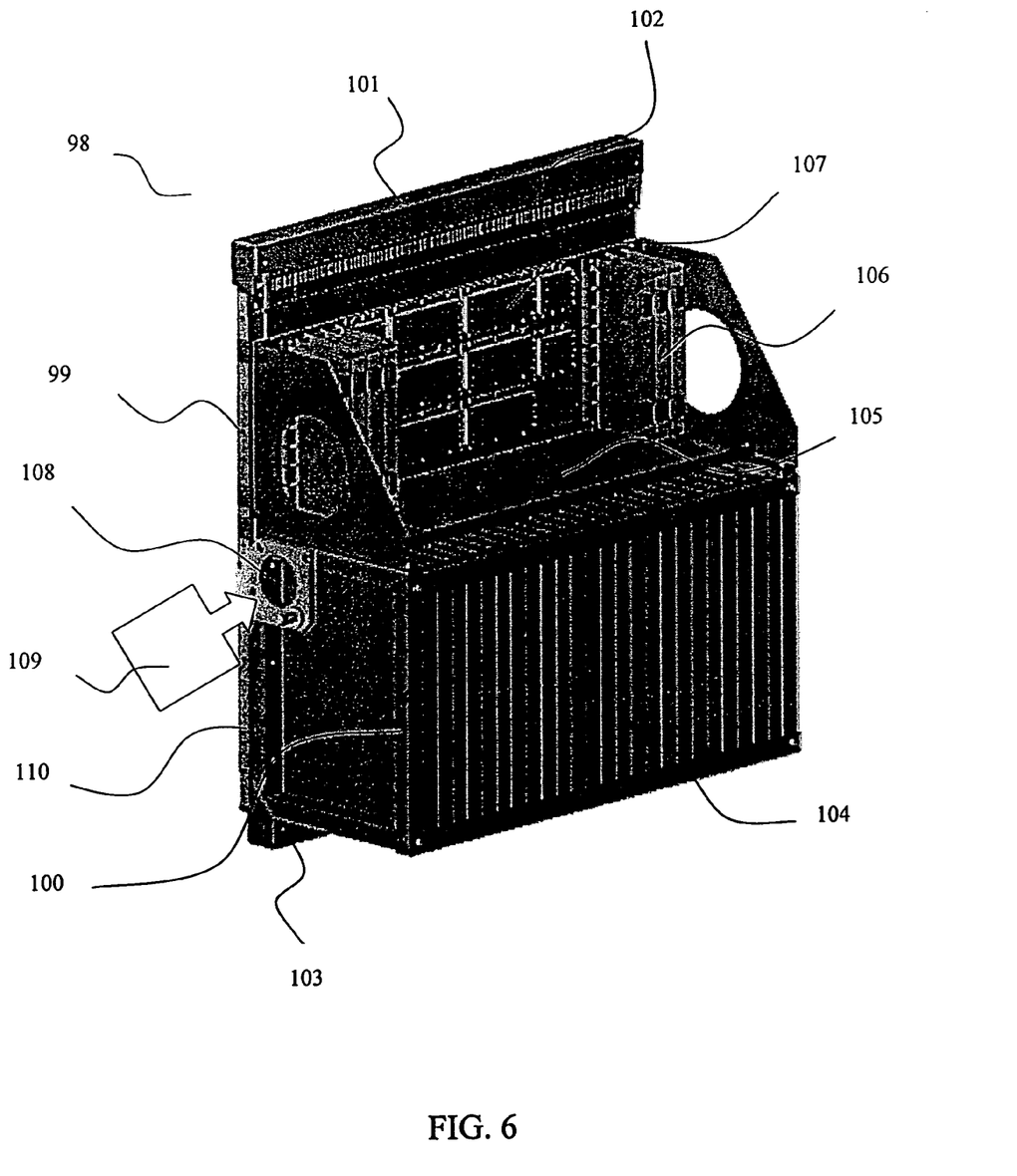
FIG. 6 is a drawing of a imager system in package form.

As shown in FIG. 6, PMC-2 imager 98 is packaged inside a lightweight aluminum frame 103 to ensure its rigidity, compactness and for the mechanical protection of the system components. Slotted antenna 99 is attached to a honeycomb plate 110 which is mounted onto the front of the frame. Front-end octapak amplifier modules 101 are attached to the antenna 99 at the top of plate 110. Phase processor board 102 is also attached to plate 110 and connected to the front-end octapacks such that the entire front end portion of the imager makes a very compact low profile unit. Back-end octapaks 103 are connected to the phase processor at the bottom edge of the plate 110. Frequency processors are arranged in 8 board groups and enclosed in 24 shielded cassettes 104 which are connected to the outputs of the back end octapacks 103. Imager components are powered by a power supply 107. Shielded interface board 105 and octapak control boards 106 are also mounted within the frame. The frame can be attached to external mounting structures using hinges 108 and mounting adapters 109 on both sides of the frame. The mounting adapters ensure proper orientation of the imager with respect to the target as well as adequate cushioning and isolation from vibration. (Note that the imager as shown in FIG. 2 must be tilted backwards 18 degrees for the center of the elevation field of view to be horizontal.

Processor Board Manufacture

Due to the exotic materials required to keep losses low, actually producing the phase and frequency processors boards is a huge undertaking in and of itself. Due to the high losses of most circuit board materials at W-band, the best existing material commercially available had a loss per inch that was more than twice what initial calculations showed could be tolerated. In other words, current materials had about 20 dB too much loss. After considerable effort, Applicants found that the preferred board was a di-clad material that consisted of low loss polypropylene sandwiched between sheets of half ounce (0.7 mil thick) rolled (ultra smooth) copper sheeting.

To reduce radio frequency interference and provide mechanical stability, a symmetric sandwich like structure for the boards was developed. In this approach, two di-clads are melt laminated together with on one board, the entire inner copper layer removed and on the inner layer of the other board, the Rotman lens structure etched into it.

Prototype Units

Applicants and their fellow workers have built and tested two versions of the preferred embodiment of the present invention that has been described above. One of these units was designed for aircraft use to permit seeing through fog and other bad weather and the other was specifically designed for concealed weapons and explosive detection. The first was successfully flight tested on a helicopter and delivered to a Department of Defense agency and the second was tested, demonstrated and delivered to a Department of Justice agency. Both operated at a 30 frames per second video rate, met program goals and produced desired images.

Other Embodiments

Persons skilled in the art of the mm-wave imaging recognize that many modifications can be made to the examples presented above. A system operating in various mm-wave and sub-millimeter wave frequency bands can be designed using similar principles. The number of resolved beams and corresponding number of phase and frequency channels in the beam-former processors would vary with the antenna size and frequency bandwidth of the system. The amplifier gain budget must be adjusted to allow for signal losses in signal processing boards and to provide adequate output power for each particular design embodiment. A polarization rotator can be positioned in front of the antenna to improve sensitivity to a preferred incident wave polarization. A dielectric lens can be placed in front of the antenna to position system focal plane at a desired distance.

While the present invention has been described above in terms of particular embodiment, persons skilled in the art will recognize that many other changes may be made. For example, infrared or visible cameras synchronized with the millimeter wave scanner may be adapted to provide correlated identity and reference information. Better system reliability and performance could be achieved by providing automatic system self diagnostics and settings optimization. Increasing the size of the antenna would also improve its spatial resolution. Therefore, the scope of the present invention should be determined by the appended claims and their legal equivalents.

We claim:

1. A video rate millimeter wave imaging device for producing video rate two-dimensional images, defining a first dimension and a second dimension comprising:
   A) an antenna for collecting millimeter wave radiation from a field of view and directing that radiation into a first plurality of channels to produce high-frequency signals for each of said first plurality of channels,
   B) a first array of low-noise MMIC amplifiers for amplifying the high-frequency signals, at frequencies higher than 60 GHz, in each of said first plurality of channels to produce a first plurality of amplified high-frequency signals,
   C) a phase processor for processing said first plurality of amplified signals to produce a second plurality of signals in a second plurality of channels, each signal in said second plurality of signals being representative of an angular direction in said first dimension,
   D) a second array of low-noise MMIC amplifiers for amplifying each of said second plurality of high-frequency signals, at frequencies higher than 60 GHz, in said second plurality of channels to produce a second plurality of amplified high-frequency signals,
   E) a plurality of frequency processors, one for each channel of said second plurality of channels for processing said second plurality of amplified high-frequency signals, each frequency processor of said plurality of frequency processors, producing a plurality of high-frequency signals each of said high-frequency signals in said second plurality of high-frequency signals corresponding to a separate angular direction in said second dimension,
   F) a plurality of detectors for detecting each of said plurality of high-frequency signals produced by each of said plurality of frequency processors, to produce a plurality of detector signals, and
   G) electronic circuitry for converting said plurality of detector signals to two-dimensional images of said field of view at rates of 10 Hz or greater.

2. The device as in claim 1 wherein said antenna is a slotted flat panel antenna.

3. The device as in claim 1 wherein each amplifier in said first and second arrays of low-noise amplifiers are comprised of a plurality of MMIC amplifier units.

4. The device as in claim 2 wherein each of said MMIC amplifier units utilize a co-planer wave guide design on an indium phosphide substrate.

5. The device as in claim 2 wherein each amplifier in said first and second arrays of amplifiers are packaged together with other amplifiers in amplifier packages.

6. The device as in claim 2 wherein each package in said amplifier packages comprises eight amplifiers.

7. The device as in claim 3 wherein each amplifier in said first and second array of amplifiers comprise a band pass filter.

8. The device as in claim 3 wherein each MMIC amplifier unit comprises quarter wave lines terminated with bypass capacitors.

9. The device as in claim 1 wherein said phase processor comprises a Rotman type lens.

10. The device as in claim 1 wherein said frequency processor comprises a Rotman type lens.

11. The device as in claim 1 wherein said frequency processor comprises a Rotman type lens and said phase processor also comprises a Rotman type lens.

12. The device as in claim 1 wherein said first plurality of channels is about 232 channels, said second plurality of channels is about 192 channels and said plurality of high-frequency signals produced by each of said frequency processors is about 128 signals.

13. The device as in claim 1 wherein said electronic circuitry comprises readout chips, an electronics interface board and a personal computer.

14. The device as in claim 13 wherein said two-dimensional image is displayed on a computer monitor.

* * * * *